UNITED STATES PATENT OFFICE.

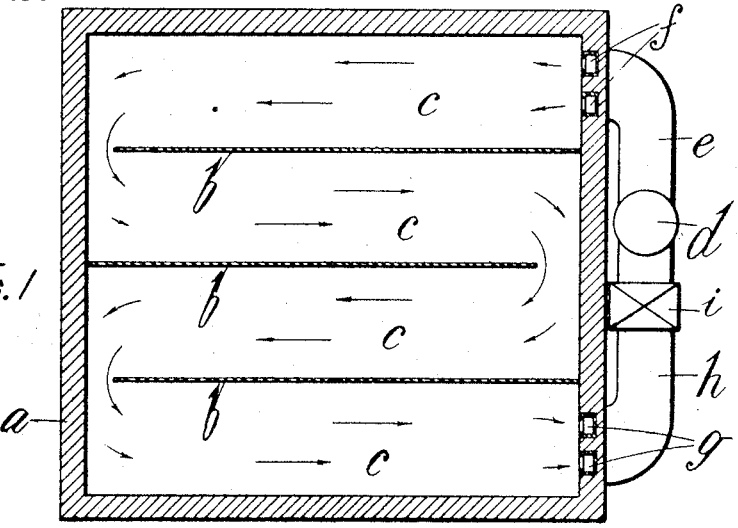
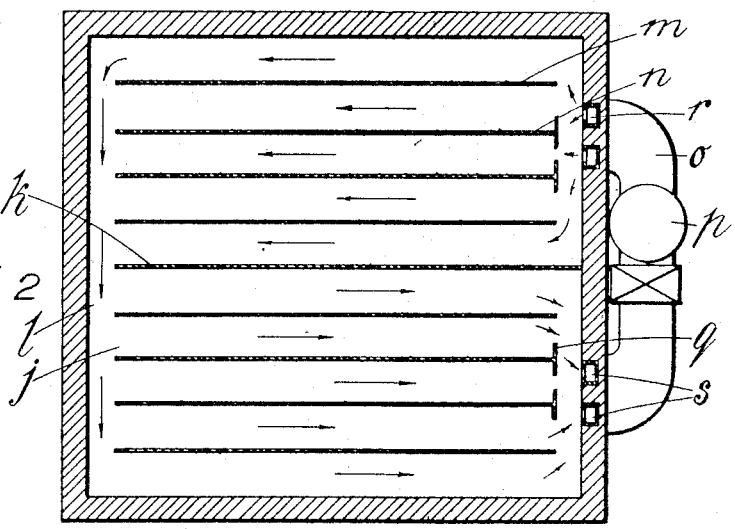
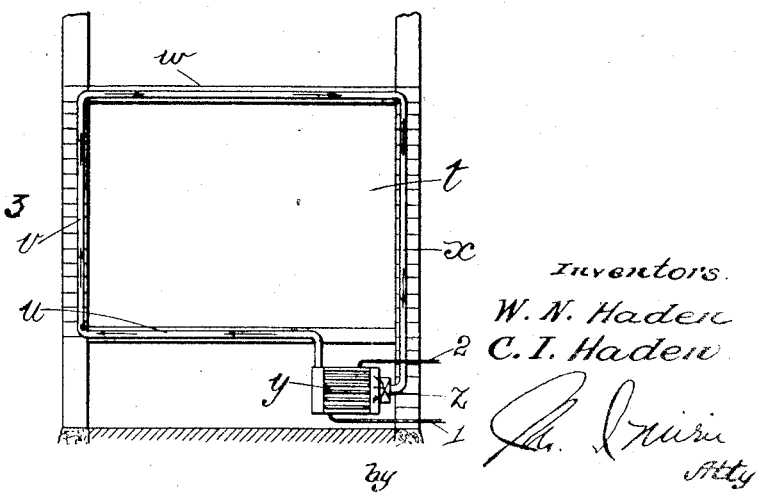

WILLIAM NELSON HADEN AND CHARLES INGHAM HADEN, OF TROWBRIDGE, ENGLAND.

HEATING AND COOLING OF BUILDINGS.

1,406,852. Specification of Letters Patent. Patented Feb. 14, 1922.

Application filed November 9, 1920. Serial No. 422,930.

(GRANTED UNDER THE PROVISIONS OF THE ACT OF MARCH 3, 1921, 41 STAT. L., 1313.)

*To all whom it may concern:*

Be it known that we, WILLIAM NELSON HADEN and CHARLES INGHAM HADEN, both citizens of the United Kingdom of Great Britain and Ireland, and both residents of St. Georges Works, Silver Street, Trowbridge, in the county of Wiltshire, England, have invented certain new and useful Improvements in Heating and Cooling of Buildings, for which we have filed an application in Great Britain, February 1, 1917, Patent No. 112,982, and of which the following is a specification, such as will enable others skilled in the art to which it appertains to make and use the same.

This invention relates to the heating and cooling of buildings by passing heated or chilled air through passages under the floors of the rooms or other apartments in the building with suitable connection from one floor to another such as flue blocks or pipes.

According to the invention the heated or cooled air is continuously circulated through the said passages or other connections and through the heating or cooling agent instead of being allowed to escape to the atmosphere as has hitherto been the practice.

One or more propellers or other accelerators may be employed where desired and it is quite possible to use the same device, such as a battery of tubes for supplying heat at one time and cold at another as by the application of hot gases or chilled water to the outside of the tubes.

The invention is illustrated diagrammatically in the accompanying drawings in which:—

Fig. 1 is a plan partly in section illustrating the application of the system.

Fig. 2 is a similar view showing a slightly modified form.

Fig. 3 is a view in vertical section, partly in elevation of the same.

Fig. 1 shows the plan of a floor in room *a*, said floor being divided by three partitions *b* so as to form a circuitous or to and fro passage *c*. Exteriorly of the room a furnace *d* is connected by tube *e* and flue blocks *f* with one end of the passage *c* the other end of the passage being connected by flue blocks *g* through pipe *h* in which is a fan *i* with the furnace *d*. The furnace and exterior pipes may be at any convenient level relative to the floor to be heated.

In Fig. 2 a modification is shown in which the floor *j* is divided by partition *k* leaving only a small passage at *l*. The two halves of the floor are divided by partitions *m* and *n* into passages through which the hot or cold air from the pipe *o* and heating or cooking agent *p* circulates. Partitions *n* have T-shaped ends *q* adjacent the flue blocks *r* and *s* for the purpose of preventing too direct a flow of the heated or cooled air.

In Fig. 3 a room *t* is shown in section and has in its floor a pipe *u* which may zig-zag in the floor before being connected to the rising pipe *v* which takes the air to the floor *w* above and may heat or cool it before being conducted by the down pipe *x* to the battery of tubes *y*. A fan is fitted at *z*.

In this case the battery of tubes *y* is enclosed and has hot or cold water as may be required in the cold or hot season conducted to and from it by the tubes 1 and 2.

The passages in the floors may be formed therein or may be produced by laying pipes and it will be evident that by passing hot or cold air through the passages or pipes the temperatures of the rooms will be raised or lowered and that by continuously circulating the same air, whether heated or chilled, will be economical in the use of the heating and cooling agent.

What we claim and desire to secure by Letters Patent is:—

A means for varying the temperature of buildings, consisting in circulating a medium of appropriate temperature through a completely closed circuit including passages in the floors of the building, other passages in the walls of the buildings and connecting the passages of one floor to those of another floor, and an agent arranged in said circuit for maintaining a desired temperature of the circulating medium, and an accelerator for the circulating medium arranged in said circuit.

In witness whereof, we have hereunto set our hands in presence of two witnesses.

WILLIAM NELSON HADEN.
CHARLES INGHAM HADEN.

Witnesses:
HENRY FAIRBROTHER,
CHARLES WALTERS.